United States Patent [19]

Stenger-Smith et al.

[11] Patent Number: 5,585,522

[45] Date of Patent: Dec. 17, 1996

[54] AMINO SUBSTITUTED BISHALOMETHYL BENZENE COMPOUNDS

[75] Inventors: John D. Stenger-Smith; William P. Norris; Andrew P. Chafin, all of Ridgecrest, Calif.

[73] Assignee: The United States of America as represented by the Secretary of the Navy, Washington, D.C.

[21] Appl. No.: 441,179

[22] Filed: May 10, 1995

Related U.S. Application Data

[62] Division of Ser. No. 252,701, May 31, 1994, abandoned.
[51] Int. Cl.$^6$ .................................................. C07C 211/52
[52] U.S. Cl. .......................... 564/442; 564/289; 564/440; 564/441
[58] Field of Search .................................. 564/239, 440, 564/441, 442

[56] References Cited

U.S. PATENT DOCUMENTS 3,457,310  7/1969  Fischback et al. ...................... 260/562

Primary Examiner—Peter O'Sullivan
Attorney, Agent, or Firm—Stephen J. Church; Melvin J. Sliwka; John L. Forrest, Jr.

[57] ABSTRACT

Novel amino substituted bishalomethyl benzene compounds, which are precursors to phenylene polymers are disclosed having non-linear optical properties, and which can be converted to electrically conductive polymers. Such polymers are produced by reacting a novel amino substituted bishalomethyl benzene compound with a dialkyl sulfide to make a bis-cycloalkylene sulfonium salt of 2,5,N,N-tetramethylaniline hydrochloride, which is 2,5-(N,N-dimethyl)aniline hydrochloride dimethylene bis-(tetramethylene sulfonium chloride) and reacting this sulfonium salt with alkali metal hydroxide to form a cycloalkylene sulfonium salt precursor polymer, and then heating the precursor polymer under conditions to produce the amino substituted phenylene vinylene polymer, such as poly(2-(N,N-dimethylamino) phenylene vinylene). The polymers can also be made directly by treatment of the bis chlormethyl dimethyl aminobenzene hydrochloride derivative with alkali metal alkoxide.

6 Claims, No Drawings

AMINO SUBSTITUTED BISHALOMETHYL BENZENE COMPOUNDS

CROSS-REFERENCE TO RELATED APPLICATION

This application is a division of application Ser. No. 08/252,701 filed 31 May 1994, now abandoned.

BACKGROUND OF THE INVENTION

This invention relates to the production of amino substituted bishalomethylbenzene compounds which are precursors for polymers with electrical and/or third order non-linear optical (NLO) properties, and is particularly concerned with the preparation of novel amino substituted bishalomethylbenzene compounds.

Polymers with electrical properties can be used for electromagnetic shielding, electronic counter measures, electrical device fabrication, and optical switching. Polymers with third order NLO properties can be used in smart skins, eye protection and optical switching.

The U.S. Pat. Nos. 4,599,193, 4,626,588 and 4,528,118 give some information on the synthesis of the precursors for poly(para-phenylene vinylene), (PPV), and the synthesis of precursors for substituted PPV's. However, they do not teach the incorporation of amino substituents into bishalomethylbenzene compounds, nor do they claim amino substituents of bishalomethylbenzene compounds as part of their invention.

In the article "Synthesis and Electrical Conductivity of $AsF_5$-Doped Poly(Arylene Vinylenes)" by S. Antoun, et al., Polymer Bulletin, 15,181–184 (1986), a series of polymers containing 2,5-disubstituted phenylene vinylene units, and the polymer containing 1,4-naphthalene vinylene units, were prepared by polymerization of their bis(sulfonium salts) through a base elimination reaction in solution. Films of these polymers were cast from aqueous solution and chemically treated (doped) with $AsF_5$ vapor. The electrical conductivity of the doped films varied greatly with changes in polymer structure. The preparation of poly(1,4-naphthalene-vinylene) is also disclosed in the article "Preparation and Electrical Conductivity of Poly(1,4 Naphthalene Vinylene)" by S. Antoun, et al., Journal of Polymer Science: Part C: Polymer Letters, Vol 24, 503–509, (1986). The preparation of dimethyl 2-(N,N-dimethylamino)terephthalate is described in H. Kauffmann, et al., Justus Liebig's Annalen der Chemie, 26, 393 (1912).

One object of the present invention is the provision of novel polymers having non-linear optical properties and/or electrical conductivity properties, and precursors of such polymers.

Another object is to provide certain amino substituted bis(halomethyl benzene compounds as precursors for such polymers.

SUMMARY OF THE INVENTION

The above objects are achieved according to the invention by the provision of a class amino substituted halomethyl benzene compounds characterized by the following general formula:

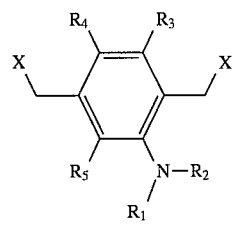

where the substituents R1 and R2 on the amine (and quarternized amine) group can be: hydrogen; alkyl from 1 to about 22 carbon atoms, such as methyl; alkyl sulfonate with alkyl from about 1 to 22 carbon atoms such as decyl sulfonate; alcohol from 1 to about 22 carbon atoms such as propanol. The substituents R3, R4 and R5 can be: hydrogen; alkyl of from 1 to about 22 carbon atoms, such as methyl; alkoxy containing from 1 to about 22 carbon atoms, such as methoxy; nitro; halogen; amine (and quarternized amine) as described above; sulphonate groups; silyl; perfluoro alkyl, such as ($CF_3$); and cyano esters.

A preferred variety of this invention is 2,5-bis-chloromethyl-(N,N-dimethyl)aniline hydrochloride having the structure shown below.

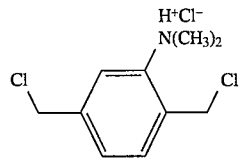

Another preferred variety of this invention is 2,5-bis-chloromethyl-3-nitro-(N,N-dimethylamino) benzene having the structure shown below.

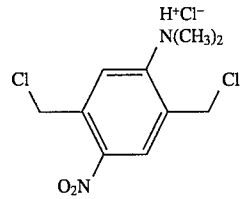

The above class of materials can be made either into sulfonium salts, which can be made in to polymers the films of which can be formed by casting from a solvent solution, with the resulting films exhibiting strong, stable nonlinear optical properties. Such films become highly electrically conductive after a suitable doping treatment. The above class of materials can also be made into polymer directly yielding powders of the polymer which can be pressed into pellets.

DETAILED DESCRIPTION OF THE INVENTION AND PREFERRED EMBODIMENTS

The amino functional bishalomethyl benzene compounds are prepared via a multi-step synthesis and are represented by the following general formula:

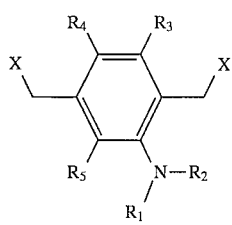

where: X is halogen; the substituents R1 and R2 on the amine (and quarternized amine) group can be: hydrogen; alkyl from 1 to about 22 carbon atoms, such as methyl; alkyl sulfonate with alkyl from about 1 to 22 carbon atoms such as decyl sulfonate; alcohol from 1 to about 22 carbon atoms such as propanol. The substituents R3, R4 and R5 can be: hydrogen; alkyl from 1 to about 22 carbon atoms, such as methyl; alkoxy containing from 1 to about 22 carbon atoms, such as methoxy; nitro; halogen; amine (and quarternized amine) as described above; sulphonate groups; silyl; perfluoro alkyl, such as (CF$_3$); and cyano esters.

In amino substituted bis(halomethyl)benzene compounds of the present invention, the amine group may be quaternized by hydrogen halides such as hydrochloric acid; alkyl and aryl halides, such as methylbromide and bromomethylbenzene, having 1 to about 22 carbon atoms; alkyl sulfonate, such as sodium camphor sulfonate, having 1 to about 22 carbon atoms; alcohol, such as chloropropanol, having from 1 to about 22 carbon atoms; and acids such as trifluoroacetic, camphor sulfonic, and toluene sulfonic.

The sulfonium salt can be reacted in the presence of alkali metal hydroxide at reduced temperature to form a cycloalkylene sulfonium salt precursor polymer. This is followed by evaporation of solvent and then heating of such precursor polymer under conditions to form the amino substituted phenylene vinylene polymer I above. Thus, poly(2-(N,N-dimethylamino) phenylene vinylene) can be prepared by the polymerization of the bis-sulfonium salt, 2,5-(N,N-dimethyl)aniline hydrochloride dimethylene bis-(tetramethylene sulfonium chloride) in solution in water, or other suitable solvent, in the presence of sodium hydroxide, at low temperature, such as 0° C., to form a cycloalkylene sulfonium salt precursor polymer, followed by heating of the precursor polymer at a temperature between about 150° C. and about 300° C., in vacuo, according to the following reaction scheme:

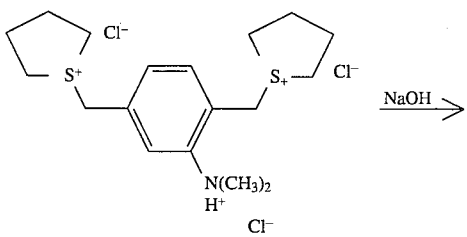

III

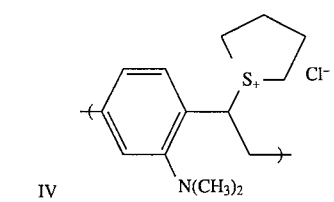

IV

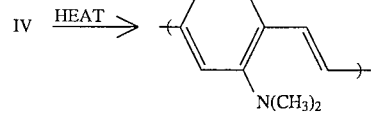

V

Poly(2-(N,N-dimethylamino) phenylene vinylene), can also be prepared by treating the aniline hyrdrochloride with strong base such as potassium tert-butoxide (KO-t-Bu) in solvents such as dry tetrahydrofuran under nitrogen. In this case the polymer V is formed immediately.

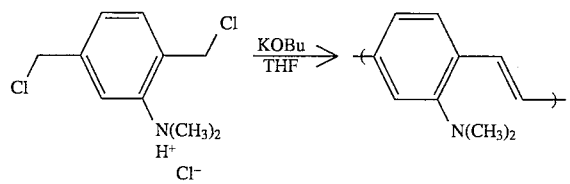

The bis-cycloalkylene sulfonium monomer salts (III) and the bis chloromethyl amines (IX) noted above are novel compounds which, such as in the case of the dimethylamino derivative compound III noted above, can be prepared by the following reaction scheme:

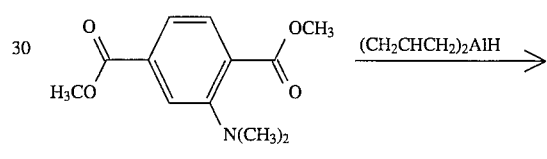

VI

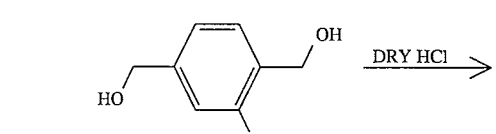

VII

VIII

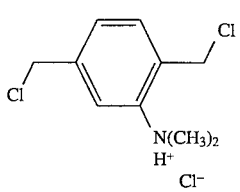

IX and then reacting the resulting chlorinated compound IX with a solution of tetrahydrothiophene in methyl alcohol, or other polar solvent, to form the bis-cycloalkylene sulfonium monomer salt III above. The corresponding bromide derivative of monomer salt III above can be prepared in the same manner as described above, substituting thionyl bromide for the thionyl chloride.

It is noted that one or more of various substituents R1 and R2 can be various types of hydrocarbons. Specific examples of such substituents include: hydrogen; alkyl from 1 to about 22 carbon atoms, such as methyl; alkyl sulfonate with alkyl from about 1 to 22 carbon atoms such as decyl sulfonate; alcohol from 1 to about 22 carbon atoms such as propanol. It is further noted that one or more of the other substituents R3, R4 and R5 can be: alkyl of from 1 to about 22 carbon atoms, such as methyl; alkoxy containing from 1 to about 22 carbon atoms, such as methoxy; nitro; halogen; amino as described above; sulphonate groups; silyl; perfluoro alkyl, such as ($CF_3$); and cyano esters. Thus, examples of specific compounds of the invention in addition to 2,5-bis-chloromethyl-(N,N-dimethyl)aminobenzene hydrochloride include 2,5-bis-chloromethyl-3,6-dimethoxy-(N,N-dimethyl)aminobenzene hydrochloride, 2,5-bis-chloromethyl-3-hexyl-4-pentyl-6-ethyl-(N,N-dimethyl)aminobenzene hydrochloride, 2,5-bis-chloromethyl-1,4-bis-(N,N-dimethyl)aminobenzene hydrochloride etc.

The following are examples of practice of the invention.

EXAMPLE 1

Preparation of 2,5-bis(Hydroxymethyl)-N,N-dimethylaniline Hydrochloride VIII Into a 500 ml Round bottom flask, 10 grams (0.0421 mol) of dimethyl 2-(N,N-dimethylamino)terephthalate (VI) (see Kauffmann et. al) and 100 ml of toluene were added. To this solution, 120 ml of 1.5 molar diisobutylaluminum hydride (DIBAL-H) were added with cooling and stirring; the reaction temperature was kept below 40° C. Completion of the reaction, that is addition of sufficient DIBAL-H, is evidenced by the disappearance of the yellow color of the original solution. After addition of sufficient DIBAL-H, the reaction temperature was kept at 40° C. for about 5 minutes. Alter this the flask was cooled to 0° C. and 400 ml of methanol was added carefully. The addition of the first few ml of methanol is accompanied by vigorous gas evolution due to the slight excess of DIBAL-H. The stirred mixture was then heated to reflux for 15 minutes, then cooled and filtered. The residue was washed with 200 ml of methanol, and the residue was discarded. The volatiles of the filtrate were removed with the rotary evaporator. The oily residue (compound VII) was dissolved in 150 ml ether. This solution was treated with hydrogen chloride gas with stirring and recrystallized from acetonitrile to give 2,5-bis(hydroxymethyl)-N,N-dimethylaniline hydrochloride (VIII). Yield (before recrystallization) 92.1%. M.P. 121°–122° C. Elemental analysis: calcd for $C_{10}H_{16}ClNO_2$: C, 55.38; H, 7.41: Cl, 16.29,; N, 6.43. Found: C, 55.52; H, 7.52; Cl, 16.36; N, 6.67.

Preparation of 2,5-bis-Chloromethyl-(N,N-dimethyl)aniline Hydrochloride, IX Thionyl chloride (35 ml) was added to 2 grams (0.00919 mol) of 2,5-bis(hydroxymethyl)-N,N-dimethylaniline hydrochloride, VIII. The 2,5-bis(hydroxymethyl)-N,N-dimethylaniline hydrochloride (VIII) went into solution immediately, accompanied by evolution of heat and gas. The reaction was stirred for several minutes. The volatiles were removed under reduced pressure to yield 2.38 g of crystalline residue, compound IX. The solid IX was dissolved in a minimum amount of hot acetonitrile; the solution was filtered, and an equivalent amount of ethyl acetate added and the solution cooled. Yield 77%. Elemental analysis: calcd for $C_{10}H_{14}Cl_3N$: C, 47.18; H, 5.54: Cl, 41.78,; N, 5.50. Found: C, 47.04; H, 5.54; N, 5.34

Preparation of 2,5-(N,N-dimethyl)aniline Hydrochloride Dimethylene bis-(Tetramethylene Sulfonium Chloride), III Into a 50-ml flask equipped with a magnetic stirrer were placed 1.75 g (0.007 mol) of 2,5-bis-chloromethyl-(N,N-dimethyl)aniline hydrochloride (IX), 3.0 g (0.032 mol) of tetrahydrothiophene, and 15 ml of methanol. The mixture was stirred and heated to 40° C. for about 5 hours. The resulting solution was cooled and precipitated into acetone, yielding a very hygroscopic resinous material. This material (III) (approximately 3 grams) was dissolved in 8 ml of water and used for the next step.

Preparation of Precursor Polymer IV

Both solutions used in the following polymerization step were deoxygenated with $N_2$ at room temperature for two (2) hours. To 8 ml of a 0.87M (approx) aqueous solution of the sulfonium salt monomer (III), (0.007 mol approx) was added all at once under nitrogen 10 ml of 1.44M aqueous solution of NaOH (0.014 mol) (the extra base is added to convert the amine hydrochloride groups of the monomer to amine groups). The contents of the flask turned orange-yellow and slightly cloudy alter about 5 minutes. After 35 minutes the pH of the water in the flask was about 12, indicating that the amine hydrochloride groups were converted. The water was neutralized to pH 5 with about 8 ml of dilute acid, and the mixture turned pale yellow and became less cloudy. This mixture was dialysed for about 4 days against slightly basic water. The resulting solution of (with a small amount of precipitate) was filtered, giving a clear solution of IV that fluoresced green upon excitation with UV light.

EXAMPLE 2

0.25 grams of compound IX was added to a solution of 0.66 g of potassium tert-butoxide in 35 ml tetrahydrofuran cooled with a dry ice/isopropanol bath. A yellow-green solution formed. After two hours the dry ice bath was removed and the solution stirred for an additional 2.5 hours at around 25° C. A bright orange powder (Polymer V) precipitated. Elemental Analysis: Calculated for $C_{10}H_{11}N$: C, 82.72; H, 7.64; N, 9.65; Found: C, 80.84; H, 7.66; N, 9.84. A suspension of the orange powder in meta cresol changed to a pale yellow emulsion upon addition of strong acids such as hydrochloric, camphor sulfonic, and trifluoro acetic acid, indicative of the formation of the quarternized ammonium salt of the polymer.

EXAMPLE 3

0.1 g of the free base of compound IX was nitrated with a mixture of 2 ml nitric acid and 6 ml of sulfuric acid. The ortho and para isomers were separated using column chromatography, confirmation of their respective structures was accomplished using Nuclear Magnetic Resonance.

From the foregoing, it is seen that the invention provides for the preparation of a novel class of amino substituted halomethyl benzene compounds employed in preparing amino substituted phenylene polymers, such polymers having non-linear optical properties and also exhibiting electrical conductivity upon electrochemical or chemical oxidation doping. Various uses of such polymers are noted above.

Since various changes and modifications can be made in the invention without departing from the spirit of the invention, the invention is not to be taken as limited except by the scope of the appended claims.

What is now claimed:

1. Amino substituted bis(halomethyl)benzene compounds having the formula:

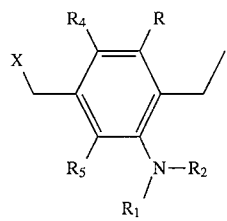

wherein X is halogen; wherein $R_1$ and $R_2$ are each independently hydrogen; alkyl having 1 to about 22 carbon atoms; alkyl sulfonate having 1 to about 22 carbon atoms; or alcohol having 1 to about 22 carbon atoms, wherein $R_3$, $R_4$, and $R_5$ are each independently hydrogen; alkyl having 1 to about 22 carbon atoms; alkoxy having 1 to about 22 carbon atoms; nitro; halogen; amine; sulphonate; silyl; perfluoro alkyl; or cyano esters, and wherein the amine group may optionally be quaternized by hydrogen halides; alkyl and aryl halides having 1 to about 22 carbon atoms; alkyl sulfonate having 1 to about 22 carbon atoms; alcohol having 1 to about 22 carbon atoms; carboxylic acids; or sulfonic acids.

2. The compound 2,5-bis-chloromethyl-(N,N-dimethyl)aniline hydrochloride having the formula

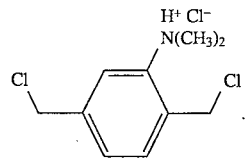

3. The compound 2,5-bis-chloromethyl-3-nitro-(N,N-dimethylamino)benzene having the formula:

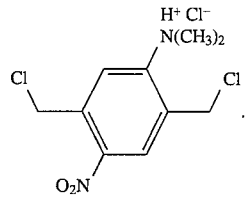

4. The amino substituted bis(halomethyl)benzene compounds of claim 1 wherein $R_1$ and $R_2$ are each independently chosen from the group consisting of methyl, decyl sulfonate, and propanol.

5. The amino substituted bis(halomethyl)benzene compounds of claim 1 wherein $R_3$, $R_4$, and $R_5$ are each independently chosen from the group consisting of hydrogen, methyl, and methoxy.

6. The amino substituted bis(halomethyl)benzene compounds of claim 1 wherein the amine group is optionally quaternized by a compound selected from the group consisting of hydrochloric acid, methylbromide, bromomethylbenzene, sodium camphor sulfonate, chloropropanol, trifluoroacetic acid, camphor sulfonic acid, and toluene sulfonic acid.

* * * * *